United States Patent
Leung

(10) Patent No.: US 12,493,364 B2
(45) Date of Patent: Dec. 9, 2025

(54) MOUSE DEVICE

(71) Applicant: Quanta Computer Inc., Taoyuan (TW)

(72) Inventor: Chee-Chun Leung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 18/346,378

(22) Filed: Jul. 3, 2023

(65) Prior Publication Data

US 2024/0220035 A1    Jul. 4, 2024

(30) Foreign Application Priority Data

Dec. 29, 2022  (TW) .................................. 111150606

(51) Int. Cl.
| | |
|---|---|
| *G06F 3/0354* | (2013.01) |
| *G06F 3/01* | (2006.01) |
| *G06F 3/03* | (2006.01) |
| *G06F 3/041* | (2006.01) |

(52) U.S. Cl.
CPC .......... *G06F 3/03543* (2013.01); *G06F 3/014* (2013.01); *G06F 3/0304* (2013.01); *G06F 3/0414* (2013.01); *G06F 2203/0331* (2013.01); *G06F 2203/04105* (2013.01)

(58) Field of Classification Search
CPC .... G06F 3/03543; G06F 3/014; G06F 3/0304; G06F 3/0414; G06F 2203/0331; G06F 2203/04105
See application file for complete search history.

(56) References Cited

U.S. PATENT DOCUMENTS

| | | | | |
|---|---|---|---|---|
| 5,832,296 | A * | 11/1998 | Wang ...................... | G06F 21/35 |
| | | | | 340/539.22 |
| 6,861,945 | B2 * | 3/2005 | Kim ...................... | G06F 3/0346 |
| | | | | 340/407.1 |
| 9,761,127 | B2 * | 9/2017 | Cheng .................... | G08C 17/00 |
| 9,798,387 | B2 * | 10/2017 | Joseph .................... | G06F 3/014 |
| 11,502,713 | B2 * | 11/2022 | Grétarsson ............ | H04B 1/385 |
| 2003/0214481 | A1* | 11/2003 | Xiong ...................... | G06F 3/017 |
| | | | | 345/157 |
| 2011/0007035 | A1* | 1/2011 | Shai ...................... | G06F 3/0304 |
| | | | | 345/179 |
| 2011/0210931 | A1* | 9/2011 | Shai .................... | G06F 3/03547 |
| | | | | 345/173 |
| 2013/0135223 | A1* | 5/2013 | Shai ........................ | G06F 3/014 |
| | | | | 345/173 |

(Continued)

FOREIGN PATENT DOCUMENTS

CN         204009775 U       12/2014

OTHER PUBLICATIONS

Chinese language office action dated May 29, 2023, issued in application No. TW 111150606.

*Primary Examiner* — Bryan Earles
(74) *Attorney, Agent, or Firm* — McClure, Qualey & Rodack, LLP

(57) ABSTRACT

A mouse device is provided, including a main body and a circuit system. The circuit system is disposed inside the main body. The circuit system has a micro-processor module and a sensing module, which are electrically connected to each other. The sensing module has an optical sensor. The optical sensor emits a sensing light to a reference surface for detecting the movements of the finger relative to the reference surface.

6 Claims, 5 Drawing Sheets

(56) References Cited

U.S. PATENT DOCUMENTS

2015/0338916 A1* 11/2015 Priyantha .............. G06F 1/1698
                                                          345/173
2017/0351345 A1* 12/2017 Nirjon .................... G06F 3/014
2021/0096657 A1*  4/2021 D'Amone ............... G06F 3/014

* cited by examiner

MOUSE DEVICE

CROSS REFERENCE TO RELATED APPLICATIONS

This Application claims priority of Taiwan Patent Application No. 111150606, filed on Dec. 29, 2022, the entirety of which is incorporated by reference herein.

BACKGROUND OF THE INVENTION

Field of the Invention

The present invention relates to a mouse device, and, in particular, to a wireless ring mouse device.

Description of the Related Art

Conventional laptop computers usually have a touchpad. However, many people are still more comfortable using a mouse as an input device. Regular mouse devices have problems such as large size and are not conducive to carrying.

When using a computer, the user will often alternate between the mouse and the keyboard, and this may be inconvenient for the user. Additionally, the risk of developing Carpal Tunnel Syndrome (CTS) may also increase after using a regular mouse device for a long time. Therefore, designing a mouse device that is convenient to use has become a challenge.

BRIEF SUMMARY OF THE INVENTION

An embodiment of the present invention provides a mouse device that can be worn on the user's finger. The mouse device includes a main body and a circuit system. The circuit system is disposed inside the main body. The circuit system includes a micro-processor module and a sensing module electrically connected to each other. The sensing module has an optical sensor that emits a sensing light to a reference surface for detecting the movements of the finger relative to the reference surface.

In some embodiments, the mouse device further includes a protrusion disposed on an outer surface of the main body, wherein the optical sensor is disposed in the protrusion.

In some embodiments, the optical sensor is disposed on an outer surface of the main body.

In some embodiments, the main body has an annular, C-shaped, or U-shaped structure.

In some embodiments, the sensing module further has a pressure sensor disposed on the inner surface of the main body.

In some embodiments, the optical sensor and the pressure sensor are located on opposite sides of the main body.

In some embodiments, the sensing module further has a click sensor that includes an inertial sensor, a tactile switch or a proximity sensor.

In some embodiments, the circuit system further includes a wireless module receiving a sensing signal from the sensing module and transmitting the sensing signal to an electronic device via the wireless module.

In some embodiments, the circuit system further includes a chargeable battery module electrically connected to the micro-processor module.

In some embodiments, the sensing module further has a biomedical sensor for detecting a bio-signal of the user.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the mouse device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
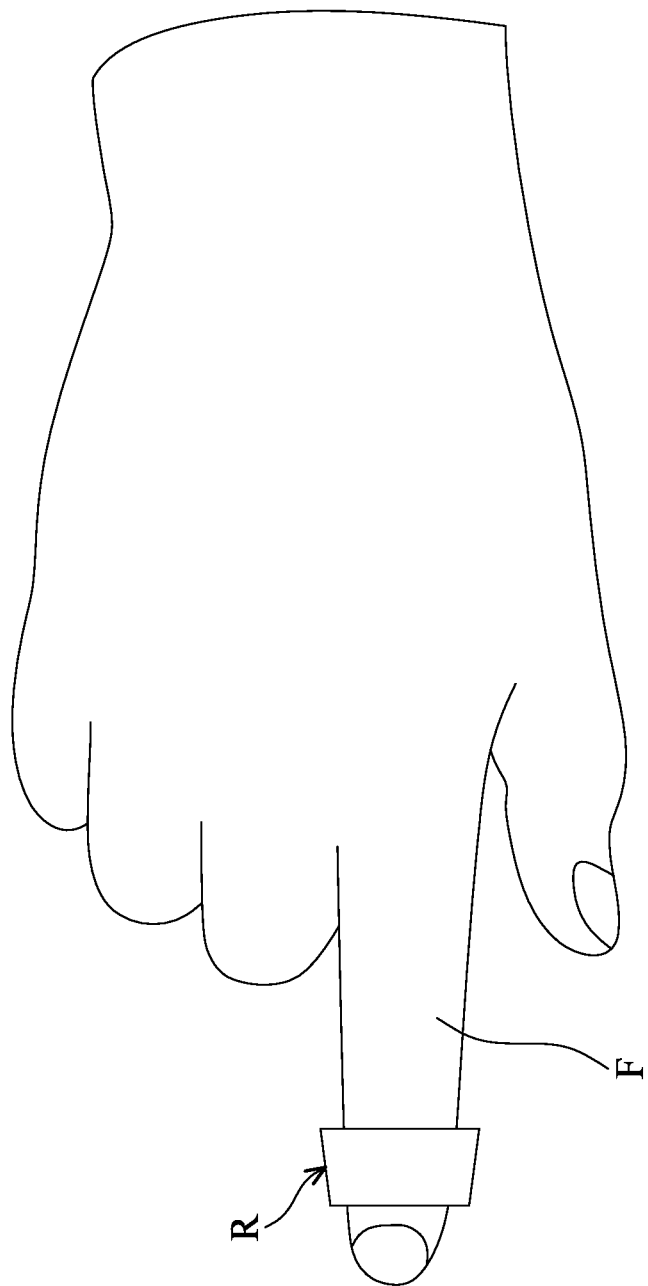
FIG. 1 is a schematic diagram of a mouse device R worn on a finger F of the user, in accordance with an embodiment of the invention.
Figure 2:
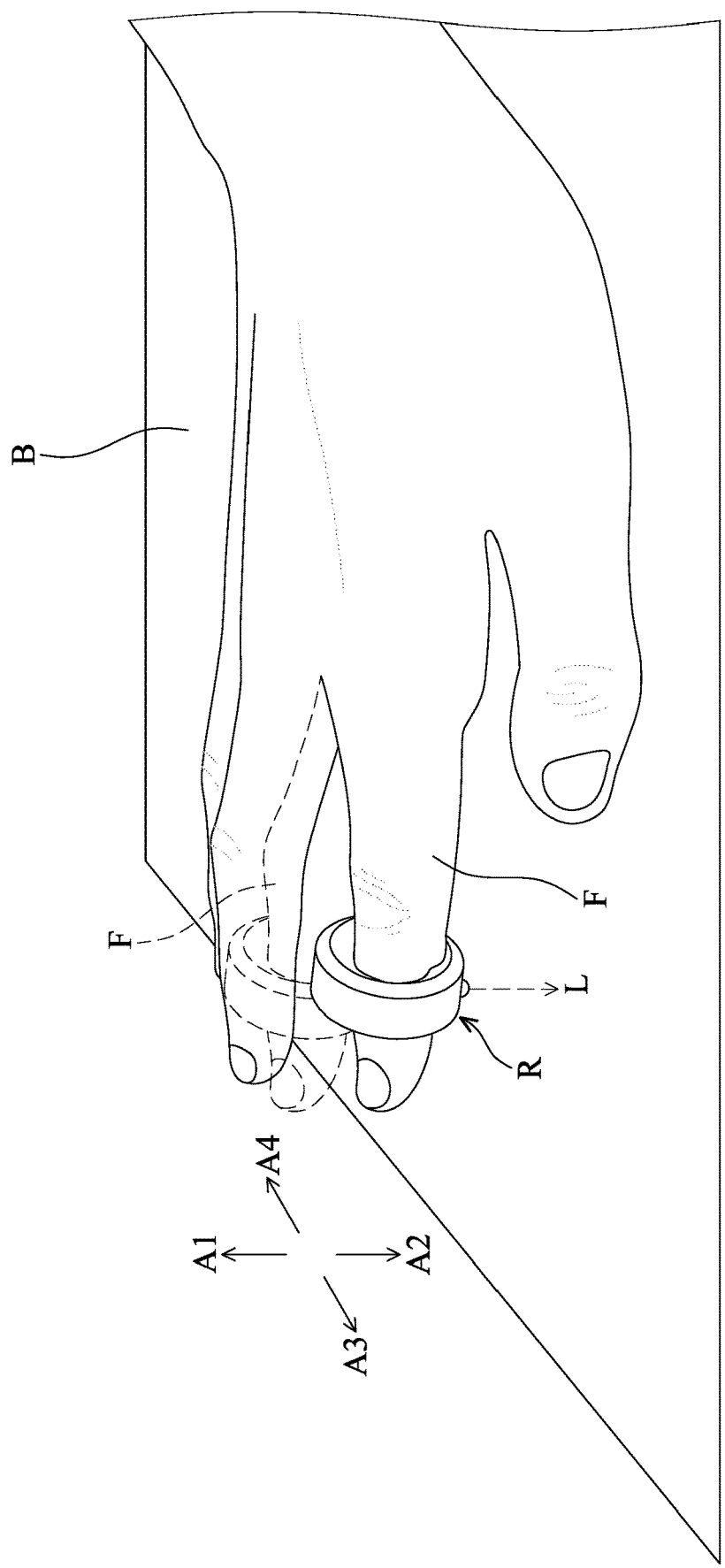
FIG. 2 is a schematic diagram showing the finger F of the user in FIG. 1 when moving relative to a reference surface B (e.g. table surface).

FIG. 1 is a schematic diagram of a mouse device R worn on a finger F of the user, in accordance with an embodiment of the invention. FIG. 2 is a schematic diagram showing the finger F of the user in FIG. 1 when moving relative to a reference surface B (e.g. table surface).

The mouse device R in FIGS. 1 and 2 is a wireless ring mouse, and it can be worn on the finger F to replace regular mouse devices. In this embodiment, the mouse device R can be used as a regular mouse to click buttons or move a cursor on a computer screen.

Specifically, the mouse device R has an annular structure that can be worn on the finger pulp of the distal phalange (or other phalange) of the index finger during usage. The user can type on the keyboard with fingertips and perform the mouse functions (e.g. moving the cursor, clicking the left, middle, right button, scrolling up/down, selection, or dragging) easily with the finger pulp of the index finger at the same time. Hence, there is no need to move the user's hand for operating the touchpad and the regular mouse device that are far from the computer, whereby convenient and comfortable use can be achieved, and the risk of Carpal Tunnel Syndrome (CTS) can be efficiently reduced.

Moreover, as the mouse device R has lightweight and compact size, it is extremely portable and easy to use. In some embodiments, the mouse device R can be accommodated in the laptop computer for space-saving and prevented from being lost, and it is therefore convenient to use. Additionally, to achieve miniaturization of the laptop computer, the touchpad on the laptop computer can be replaced by the mouse device R to reduce the dimensions of the laptop computer or save more space for the batteries.

Figure 3:
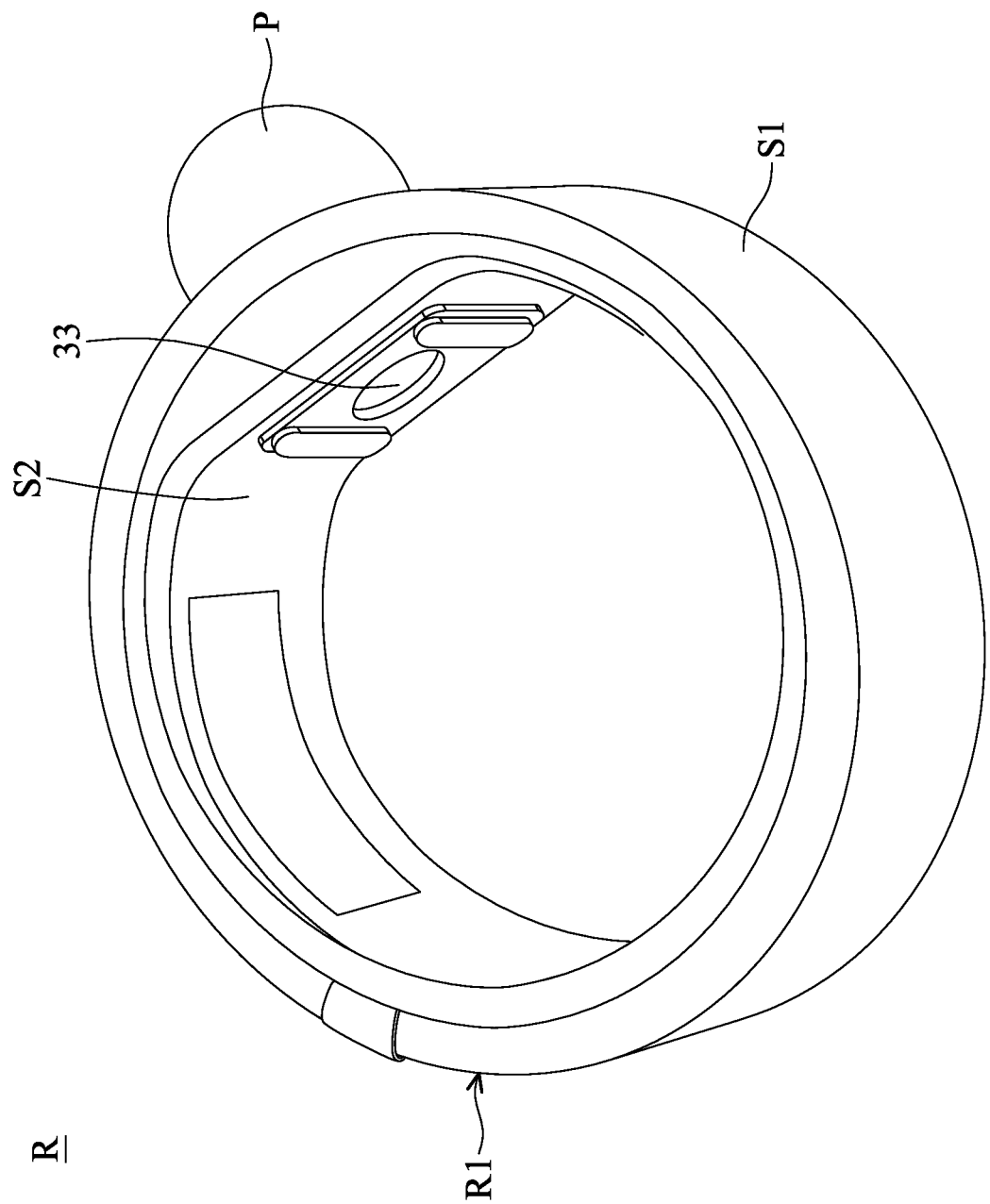
FIG. 3 is a perspective diagram of the mouse device R in FIG. 2.

FIG. 3 is a perspective diagram of the mouse device R in FIG. 2. Referring to FIGS. 2 and 3, the mouse device R comprises an annular main body R1 that has an outer surface S1 and a protrusion P on the outer surface S1. In this embodiment, a sensing element (e.g. optical sensor or click sensor) is disposed in the protrusion P for detecting the mouse functions when the user moves his/her finger. Here, the protrusion P has a hemispherical or dome-shaped structure that is suitable for moving or sliding along the table surface.

In some embodiments, the main body R1 may have a C-shaped or U-shaped structure, whereby the user can put on or take off the mouse device R easily, but the invention is not limited to the embodiments described above.

For example, an optical sensor may be disposed in the protrusion P. The optical sensor may have a laser transceiver capable of emitting a sensing light L to the reference surface B (FIG. 2). The laser transceiver can receive the reflection of the sensing light L from the reference surface B (e.g. table or keyboard surface) to determine the distance variation from the mouse device R to the reference surface B. Moreover, the displacement of the mouse device R relative to the reference surface B in the horizontal direction can also be detected.

Therefore, by disposing the optical sensor in the protrusion P, the displacements of the finger F relative to the reference surface B in the vertical direction (as the arrows A1 and A2 indicate in FIG. 2) and in the horizontal direction (as the arrows A3 and A4 indicate in FIG. 2) can be detected, and the mouse device R can be used as a regular mouse to move a cursor on a computer screen.

When performing a mouse click operation, the user can move the finger F toward the reference surface B, whereby the click sensor in the protrusion P can detect the contact between the protrusion P and the reference surface B (or the vibration signal when the protrusion P contacts the reference surface B). In some embodiments, the sensing element (e.g. optical or click sensor) in the protrusion P may determine a mouse click operation by detecting both the contact (or vibration signal) between the protrusion P and the reference surface B and the sequential movement of the finger F separating/lifting from the reference surface B.

In some embodiments, the sensing elements (e.g. optical or click sensor) can also be disposed on the outer surface S1 of the main body R1 or accommodated inside the main body R1, and the invention is not limited to the embodiments described above.

Moreover, as shown in FIG. 3, a pressure sensor 33 is disposed on the inner surface S2 of the main body R1. It should be noted that the pressure sensor 33 and the sensing element (e.g. optical or click sensor) are located on opposite sides of the main body R1.

As shown in FIG. 2, the protrusion P directly faces the reference surface B when using the mouse device R, whereby the user can move his/her finger F downward easily so that the protrusion P contacts the reference surface B. In this embodiment, the pressure sensor 33 can detect the pushing pressure of the finger F on the reference surface B to determine whether a right button clicking is performed by the user.

Figure 4:
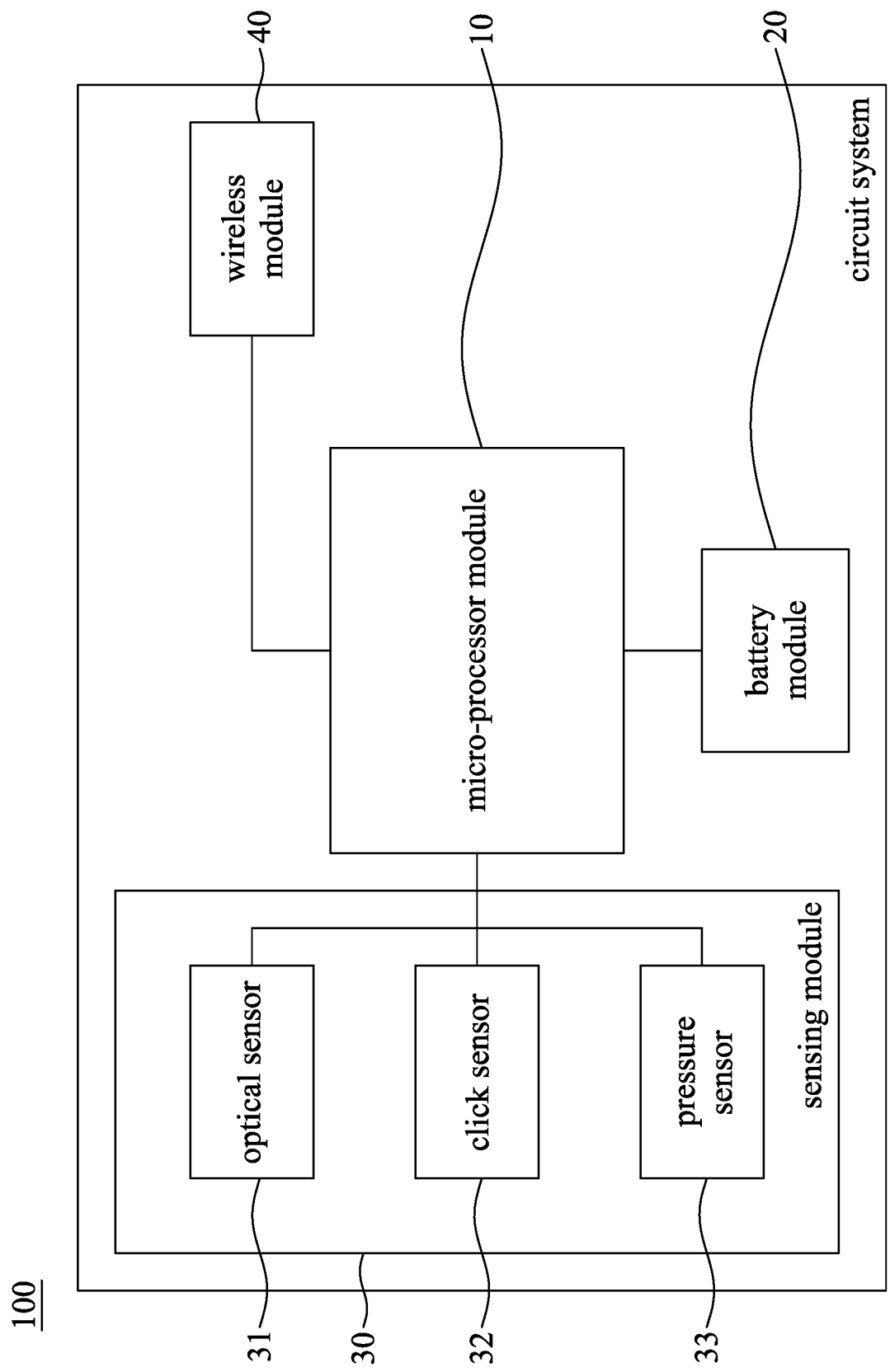
FIG. 4 is a block diagram showing a circuit system 100 of the mouse device R in FIG. 3.

FIG. 4 is a block diagram showing a circuit system 100 of the mouse device R in FIG. 3. The circuit system 100 may be disposed inside the main body R1 of the mouse device R. The circuit system 100 includes a micro-processor module 10, a battery module 20, a sensing module 30, and a wireless module 40.

In this embodiment, the battery module 20, the sensing module 30, and the wireless module 40 are electrically connected to the micro-processor module 10. Specifically, the sensing module 30 may include three sensing elements (i.e. optical sensor 31, click sensor 32, and pressure sensor 33).

The optical sensor 31 may comprise a laser transceiver that can emit a sensing light L to the reference surface B as shown in FIG. 2, whereby the displacements of the finger F relative to the reference surface B in the vertical direction (as the arrows A1 and A2 indicate in FIG. 2) and in the horizontal direction (as the arrows A3 and A4 indicate in FIG. 2) can be detected.

For example, the click sensor 32 may comprise an inertial measurement unit (IMU), a tactile switch, a proximity sensor or other optical sensing element for detecting the contact or vibration as the protrusion P touches the reference surface B, thus determining whether the regular mouse operation of clicking the left button is performed by the user.

In some embodiments, the optical sensor 31 may replace the click sensor 32 to measure the distance variation of the finger F relative to the reference surface B in the vertical direction, thus determining whether the regular mouse function of clicking the left button is performed by the user.

The micro-processor module 10 can be used to distribute electrical power to the components in the circuit system 100 and receive the sensing signal from the sensing module 30. Moreover, the micro-processor module 10 can transmit the sensing signal to an electronic device (e.g. laptop computer, desktop computer, tablet computer, or cell phone) via the wireless module 40.

The battery module 20 can be charged via a cable and a connector (e.g. USB port or metal conductive contacts). Additionally, the battery module 20 may also be charged via wireless elements (e.g. wireless charging coils), whereby the components of the circuit system 100 can be powered by the battery module 20.

For example, the battery module 20 can be charged by the following ways:

Disposing the mouse device R in a charging box and inserting a USB plug on the lateral side of the charging box into a USB port of a computer to charge the battery module 20.

Disposing a charging box in an accommodating space of a laptop computer to charge the battery module 20 inside the charging box via pogo pin connectors.

Connecting the mouse device R to a USB port on the charging box by a USB cable.

Attaching the mouse device R or the charging box to the lateral side of a laptop computer or a tablet computer by magnetic elements or other ways to charge the battery module 20 via pogo pin connectors.

As mentioned above, the mouse device R can be used as a regular mouse to perform the mouse functions (e.g. moving the cursor, clicking the left, middle, right button, scrolling up/down, selection, or dragging), and the detailed operations will be described below.

Single-Clicking the Left Button

To perform the regular mouse function of single-clicking the left button, the user can move the mouse device R to tap the reference surface B and then lift the mouse device R from reference surface B. Hence, the click sensor 32 (e.g. inertial sensor) can detect the movements of the mouse device R and determine that the user is performing the regular mouse operation of single-clicking the left button.

In some embodiments, the user may rotate the mouse device R from an initial position counterclockwise (or clockwise) by an angle around the fingertip and then return to the initial position. Hence, the click sensor 32 (e.g. inertial sensor) can detect the sequential rotations of the mouse device R and determine that the user is performing the regular mouse operation of single-clicking the left button.

Double-Clicking the Left Button

To perform the regular mouse function of double-clicking the left button, the user can move the mouse device R to tap the reference surface B and then lift up the mouse device R twice in a short period of time. Hence, the click sensor 32 (e.g. inertial sensor) can detect the movements of the mouse device R and determine that the user is performing the regular mouse operation of double-clicking the left button.

In some embodiments, the user may rotate the mouse device R from an initial position counterclockwise (or clockwise) by an angle around the fingertip and then return to the initial position twice in a short period of time. Hence, the click sensor 32 (e.g. inertial sensor) can detect the sequential rotations of the mouse device R and determine that the user is performing the regular mouse operation of double-clicking the left button.

In addition, as described above, the optical sensor 31 can also calculate the distance change from the mouse device R to the reference surface B to determine that the user is performing the function of Single-clicking the left button or Double-clicking the left button.

Single-Clicking the Right Button

To perform the regular mouse function of single-clicking the right button, the user can press the reference surface B with the mouse device R a little harder and then release. Therefore, the pressure sensor 33 (e.g. piezoelectric sensor or tactile switch) can detect a pressure value that is greater than a threshold (or the tactile switch is triggered) and determine that the user is performing the regular mouse operation of single-clicking the right button.

In some embodiments, the user may continuously press the reference surface B with the mouse device R with pressure value that is greater than a preset threshold for a period of time, whereby the pressure sensor 33 (e.g. piezoelectric sensor or tactile switch) can detect and determine that the user is performing the regular mouse operation of single-clicking the right button.

In some embodiments, a specific pattern (e.g. QR code pattern) may be formed outside the mouse device R (e.g. on the reference surface B or the keyboard), and the optical sensor 31 can scan the pattern to determine that the user is performing the regular mouse operation of single-clicking the right button.

In some embodiments, the user may rotate the mouse device R from an initial position clockwise (or counterclockwise) by an angle around the fingertip and then return to the initial position in a short period of time. Hence, the click sensor 32 (e.g. inertial sensor) can detect the sequential rotations of the mouse device R and determine that the user is performing the regular mouse operation of single-clicking the right button.

Scroll Up/Scroll Down

When the pressure sensor 33 (e.g. piezoelectric sensor or tactile switch) continuously detects a pressure value that is greater than a threshold (or the tactile switch is triggered), and the optical sensor 31 also detects that the mouse device R is moving at the same time, it can be determined that the user is performing the regular mouse operation of scroll up or scroll down.

Selection

When the cursor on the screen is located at the desired icon, and the click sensor 32 (e.g. inertial sensor) detects that the mouse device R slightly touches the reference surface B and does not lift up from the reference surface B in a short period of time, it can be determined that the user is performing the regular mouse operation of selection.

Drag-and-Drop

When the mouse device R is performing the mouse operation of selection, and the click sensor 32 (e.g. inertial sensor) detects that the mouse device R is also moving at the same time, it can be determined that the regular mouse operation of drag-and-drop is executed.

Zoom in/Out

When the user presses the Ctrl button and performs the mouse operation of scroll up/scroll down with the mouse device R at the same time, it can be determined that the regular mouse operation of zoom in/out is executed.

Figure 5:
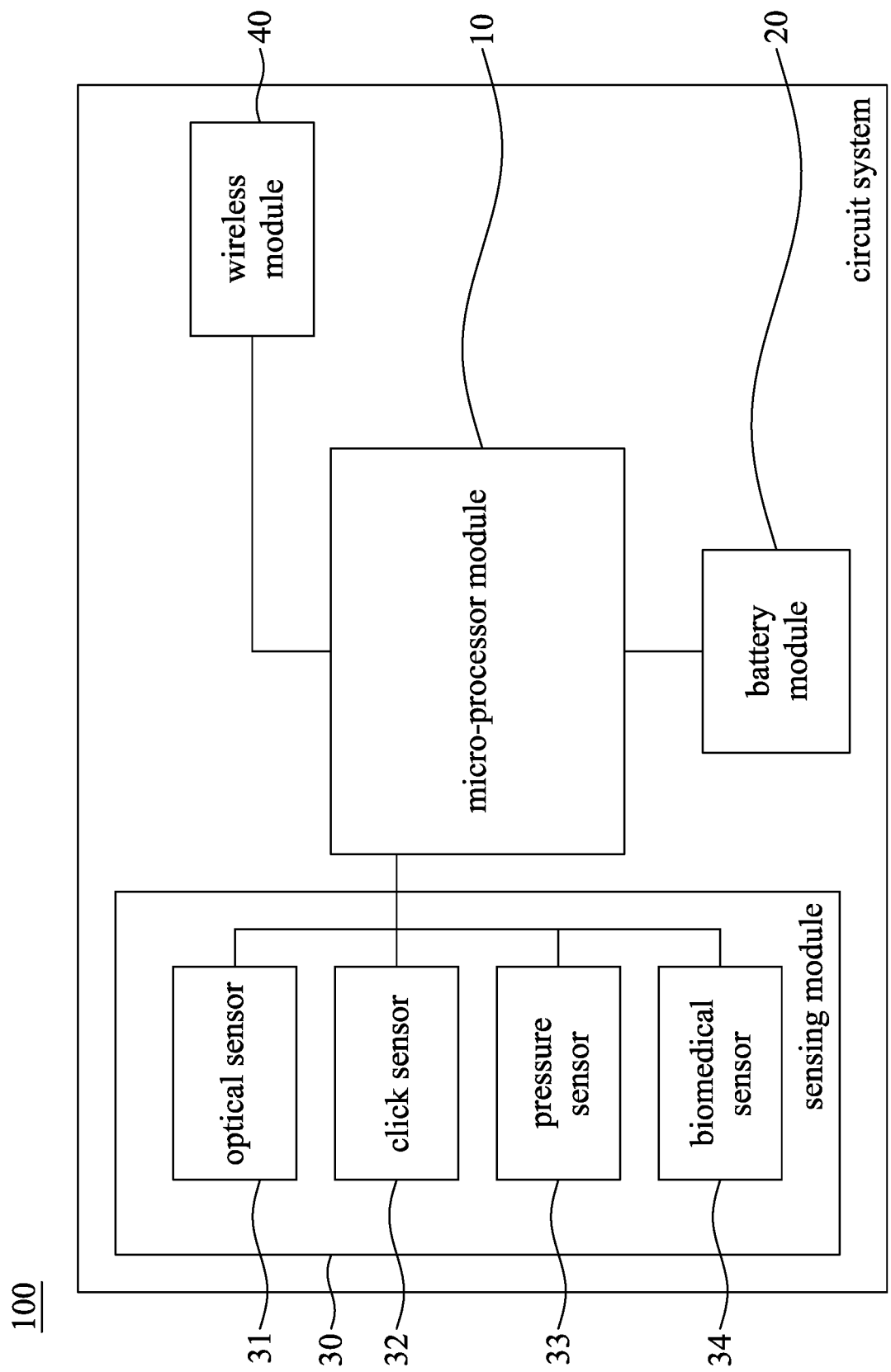
FIG. 5 is a block diagram showing the circuit system 100 in accordance with another embodiment of the invention.

FIG. 5 is a block diagram showing the circuit system 100 in accordance with another embodiment of the invention. FIG. 5 is different from FIG. 4 in that the sensing module 30 of the circuit system 100; FIG. 5 further includes a biomedical sensor 34. The biomedical sensor 34 may be disposed in the protrusion P for detecting a bio-signal of the user (e.g. heart rate or blood oxygen level). Therefore, monitoring of biomedical signals can be achieved. This increases the flexibility and versatility of the mouse device R.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A mouse device, worn on a finger of a user, comprising:
   a main body;
   a circuit system disposed in the main body, comprising a micro-processor module and a sensing module electrically connected to each other, wherein the sensing module has a pressure sensor disposed on an inner surface of the main body and an optical sensor that emits a sensing light to a reference surface for detecting movement of the finger relative to the reference surface; and
   a protrusion, disposed on an outer surface of the main body, wherein the optical sensor is received in the protrusion, the optical sensor and the pressure sensor are located on opposite sides of the main body, and the pressure sensor overlaps the protrusion along a radius direction of the main body, wherein the pressure sensor faces the finger and is located between the finger and the protrusion to detect the contact between the protrusion and the reference surface along the radius direction of the main body.

2. The mouse device as claimed in claim 1, wherein the main body has an annular, C-shaped, or U-shaped structure.

3. The mouse device as claimed in claim 1, wherein the sensing module further has a click sensor that comprises an inertial sensor, a tactile switch or a proximity sensor.

4. The mouse device as claimed in claim 1, wherein the circuit system further comprises a wireless module receiving a sensing signal from the sensing module and transmitting the sensing signal to an electronic device via the wireless module.

5. The mouse device as claimed in claim 1, wherein the circuit system further comprises a chargeable battery module electrically connected to the micro-processor module.

6. The mouse device as claimed in claim 1, wherein the sensing module further has a biomedical sensor for detecting a bio-signal of the user.

* * * * *